(12) United States Patent
Kondo (10) Patent No.: US 10,998,663 B2
(45) Date of Patent: May 4, 2021

(54) LIQUID-PROOF CONNECTOR (71) Applicant: Yazaki Corporation, Tokyo (JP)

(72) Inventor: Fuminori Kondo, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/437,187

(22) Filed: Jun. 11, 2019

(65) Prior Publication Data
US 2019/0386418 A1 Dec. 19, 2019

(30) Foreign Application Priority Data

Jun. 15, 2018 (JP) .............................. JP2018-114470

(51) Int. Cl.
H01R 13/40 (2006.01)
H01R 13/405 (2006.01)
H01R 13/52 (2006.01)
B60R 16/02 (2006.01)

(52) U.S. Cl.
CPC ......... *H01R 13/405* (2013.01); *H01R 13/521* (2013.01); *H01R 13/5202* (2013.01); *H01R 13/5216* (2013.01); *B60R 16/0207* (2013.01); *H01R 2201/26* (2013.01)

(58) Field of Classification Search
CPC ............. H01R 13/405; H01R 13/5202; H01R 13/521; H01R 13/5216; H01R 2201/26; B60R 16/0207
USPC ....................................................... 439/587
See application file for complete search history.

(56) References Cited

U.S. PATENT DOCUMENTS

| 5,351,973 A * | 10/1994 | Taniuchi | H01R 13/5205 277/616 |
| 5,704,799 A * | 1/1998 | Wood | H01R 13/52 439/271 |
| 6,036,500 A * | 3/2000 | Francis | F16F 9/463 439/34 |
| 6,102,739 A * | 8/2000 | Murakami | F16H 61/0006 439/587 |
| 6,142,805 A * | 11/2000 | Gray | H01R 13/5213 439/135 |

(Continued)

FOREIGN PATENT DOCUMENTS

| DE | 10 2017 218 603 A1 | 5/2018 |
| JP | 2014093176 A | 5/2014 |
| JP | 2015-022922 A | 2/2015 |

*Primary Examiner* — Abdullah A Riyami
*Assistant Examiner* — Vladimir Imas
(74) *Attorney, Agent, or Firm* — Sughrue Mion, PLLC (57) ABSTRACT A liquid-proof connector includes a columnar terminal having a rectangular cross-sectional shape and a connector that includes a connector housing which is obtained through insert molding with the columnar terminal, is made of fiber-reinforced plastic in which fibers are oriented in a longitudinal direction of the columnar terminal, and has a terminal holding hole to which the columnar terminal is inserted and a fitting portion which fits to a counterpart terminal. An in-holding-hole insertion portion which is a portion being present within the terminal holding hole of the columnar terminal is fixed to the terminal holding hole in an airtight state by bringing a surface in close contact with an inner surface of the terminal holding hole. Tensile strength of the fiber-reinforced plastic in a direction perpendicular to the longitudinal direction is 45 MPa or more.

6 Claims, 6 Drawing Sheets (56) References Cited

U.S. PATENT DOCUMENTS

| | | | |
|---|---|---|---|
| 7,059,918 B2* | 6/2006 | Matsumoto | B60L 50/72 |
| | | | 439/752 |
| 8,262,413 B2* | 9/2012 | Fujiwara | H01R 13/6596 |
| | | | 439/607.28 |
| 8,851,935 B2* | 10/2014 | Yoshioka | H01R 4/023 |
| | | | 439/604 |
| 8,905,784 B2* | 12/2014 | Perotto | B29C 45/14639 |
| | | | 439/587 |
| 8,920,184 B2* | 12/2014 | Murphy | H01R 13/562 |
| | | | 439/320 |
| 8,956,192 B2* | 2/2015 | Eckel | H01R 13/44 |
| | | | 439/686 |
| 8,992,249 B2* | 3/2015 | Kobayashi | H01R 13/6591 |
| | | | 439/362 |
| 9,099,814 B2* | 8/2015 | Snader | H01R 13/5219 |
| 9,577,363 B2* | 2/2017 | Lutz | H01R 13/5045 |
| 9,673,562 B2* | 6/2017 | Perot | H01R 4/308 |
| 10,050,376 B2* | 8/2018 | Suzuki | H01R 13/516 |
| 2013/0203284 A1* | 8/2013 | Perotto | B29C 45/14639 |
| | | | 439/530 |
| 2016/0141793 A1 | 5/2016 | Osada et al. | |
| 2017/0207569 A1 | 7/2017 | Arai et al. | |
| 2018/0131123 A1 | 5/2018 | Kondo | |

* cited by examiner

LIQUID-PROOF CONNECTOR

CROSS REFERENCE TO RELATED APPLICATION

This application is based upon and claims the benefit of priority from the prior Japanese Patent Application No. 2018-114470, filed on Jun. 15, 2018, the entire contents of which are incorporated herein by reference.

BACKGROUND

1. Technical Field

The present invention relates to a liquid-proof connector, and particularly, to a liquid-proof connector including a connector housing formed integrally with a columnar terminal through insert molding.

2. Related Art

In the related art, a liquid-proof connector in which a terminal portion and a connector housing are integrally formed through insert molding has been known. In recent years, since there is a demand for a liquid-proof connector that withstands higher pressure, it is necessary for a resin filler used for such a high-pressure liquid-proof connector to have high-pressure durability. It is necessary for the resin filler having high-pressure durability to further have high-humidity durability or automatic transmission fluid (ATF) durability in many cases.

However, since the high-pressure-durability resin filler having high-humidity durability or ATF durability in the related art stretches a little, there is a concern that a periphery of a terminal holding hole of the connector housing will crack or peel off during the insert molding of the terminal portion and the connector housing.

In contrast, for example, JP 2015-22922 A discloses a liquid-proof connector which includes a connector housing including a recess bottom wall having a terminal holding hole and a terminal held by being inserted to the terminal holding hole. A portion of the terminal which is buried by a resin filler has a circular cross section.

SUMMARY

In the liquid-proof connector described in JP 2015-22922 A, since the portion of the terminal which is buried by the resin filler has the circular cross section, there is a little concern that the periphery of the terminal holding hole will crack or peel off during the insert molding. However, in this liquid-proof connector, since the cross-sectional shape of the terminal is the circle and a cross-sectional area of the terminal is consequently smaller than a size of the liquid-proof connector, there is a problem that the liquid-proof connector becomes huge when the liquid-proof connector is used as a high-current liquid-proof connector.

In order for the liquid-proof connector to be used as the high-current liquid-proof connector, it is also considered that the cross-sectional area of the terminal becomes huge by forming the terminal holding hole and the cross section of the portion buried by the resin filler of the terminal of the liquid-proof connector described in JP 2015-22922 A in a rectangular shape. However, the periphery of the terminal holding hole having the rectangular cross-sectional shape tends to crack or peel off in this case. As stated above, a compact high-current liquid-proof connector which is obtained through the insert molding and has high liquid-proof properties since the periphery of the terminal holding hole hardly cracks or peels off has not been known in the related art.

The present invention has been made in view of the aforementioned problems. An object of the present invention is to provide a compact high-current liquid-proof connector which is obtained through insert molding and has high liquid-proof properties since a periphery of a terminal holding hole hardly cracks or peels off.

A liquid-proof connector according to a first aspect of the present invention includes a columnar terminal having a rectangular cross-sectional shape, and a connector that includes a connector housing which is obtained through insert molding with the columnar terminal, is made of fiber-reinforced plastic in which fibers are oriented in a longitudinal direction of the columnar terminal, and has a terminal holding hole to which the columnar terminal is inserted and a fitting portion which fits to a counterpart terminal. An in-holding-hole insertion portion which is a portion being present within the terminal holding hole of the columnar terminal is fixed to the terminal holding hole in an airtight state by bringing a surface in close contact with an inner surface of the terminal holding hole, and tensile strength of the fiber-reinforced plastic in a direction perpendicular to the longitudinal direction is 45 MPa or more.

In accordance with a liquid-proof connector according to a second aspect of the present invention, in the first aspect, a seal pressure of a terminal-and-fiber-reinforced-plastic airtight interface which is an interface between the inner surface of the terminal holding hole and the surface of the in-holding-hole insertion portion, which come in close contact with each other, is 50 kPa or more.

In accordance with the liquid-proof connector according to the present embodiment, it is possible to provide a compact high-current liquid-proof connector which is obtained through insert molding and has high liquid-proof properties since a periphery of a terminal holding hole hardly cracks or peels off.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for an embodiment of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Hereinafter, a liquid-proof connector according to an embodiment will be described in detail with reference to the drawings.

Liquid-Proof Connector

First Embodiment

Figure 1:
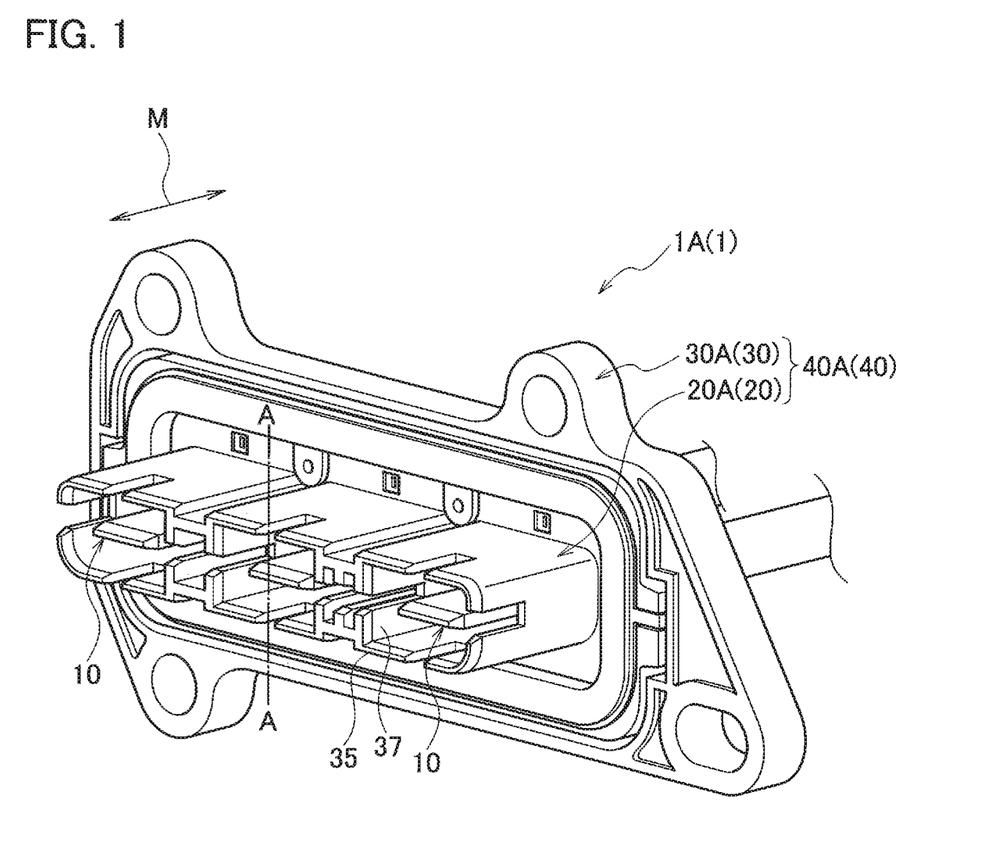
FIG. 1 is a perspective view of a liquid-proof connector according to a first embodiment.
Figure 2:
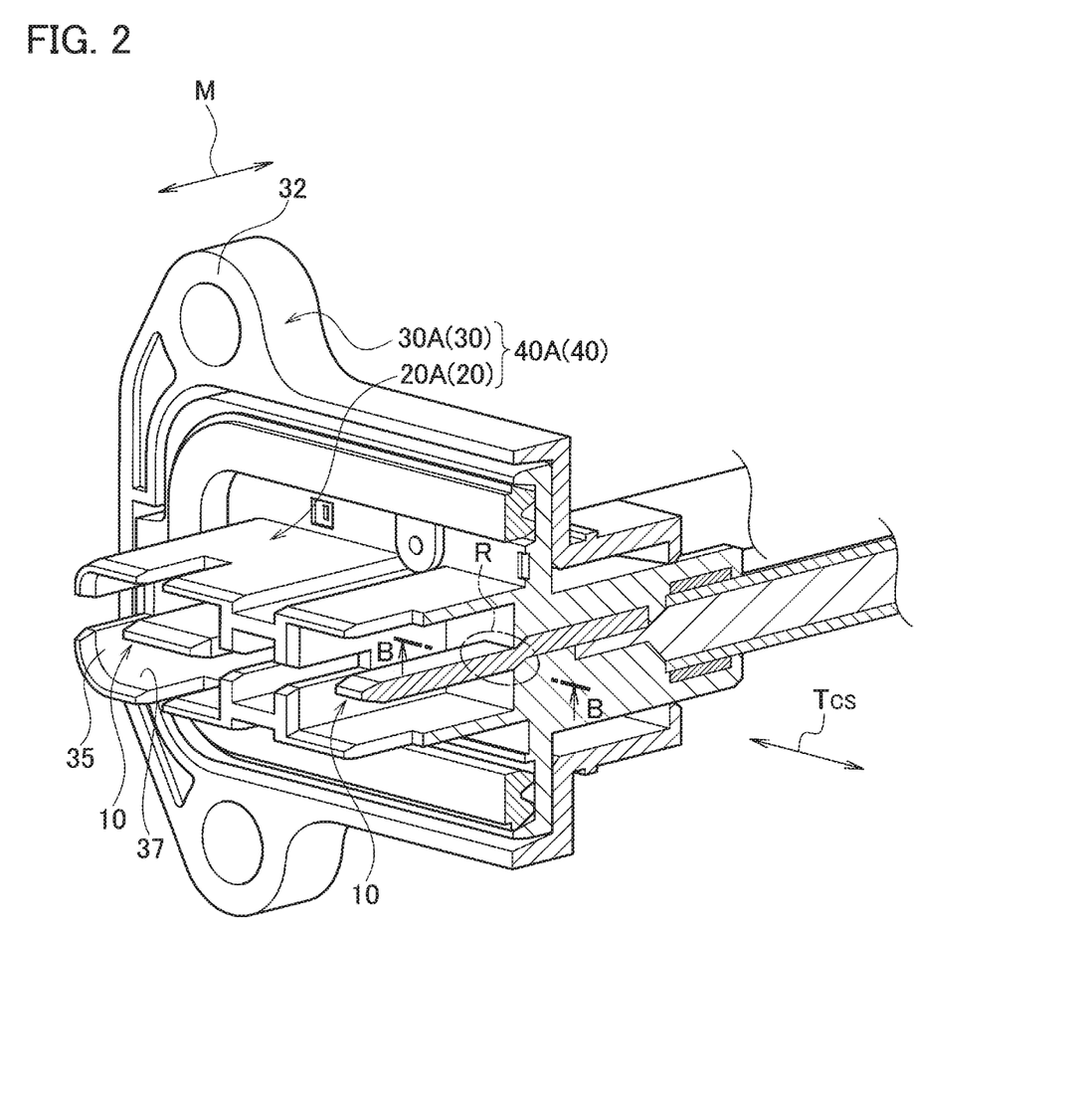
FIG. 2 is a perspective view of the liquid-proof connector according to the first embodiment which includes a cross section taken along line A-A of FIG. 1.
Figure 3:
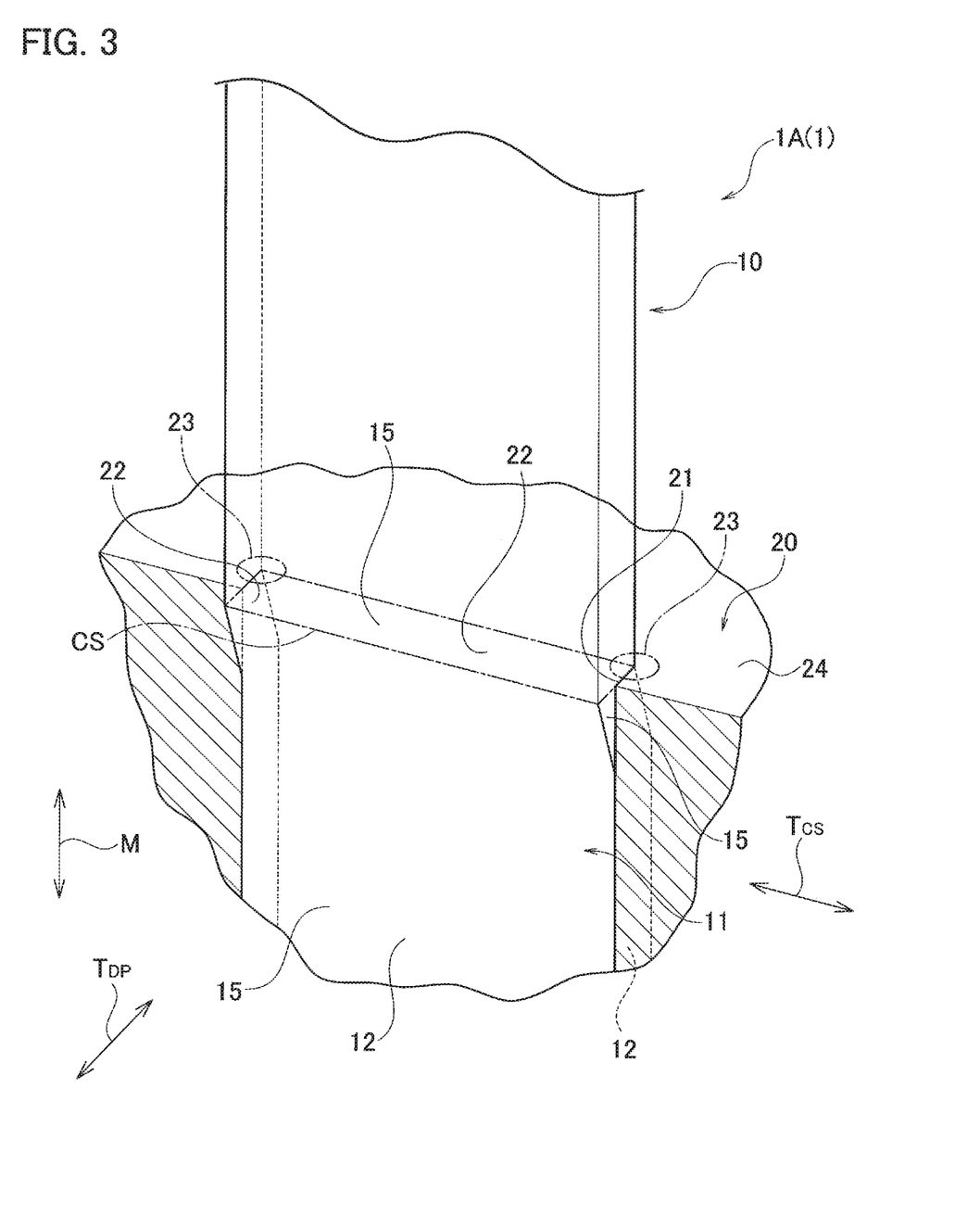
FIG. 3 is an enlarged view of a range R illustrated in FIG. 2 which includes a cross section taken along line B-B of FIG. 2.

FIG. 1 is a perspective view of a liquid-proof connector 1A according to a first embodiment. FIG. 2 is a perspective view of the liquid-proof connector 1A according to the first embodiment which includes a cross section taken along line A-A of FIG. 1. FIG. 3 is an enlarged view of a range R illustrated in FIG. 2 which includes a cross section taken along line B-B of FIG. 2.

As illustrated in FIGS. 1 and 2, the liquid-proof connector 1A (1) according to the present embodiment includes columnar terminals 10, and a connector 40A (40) which includes a connector housing 20A (20) and a connector-housing peripheral portion 30A (30).

As illustrated in FIGS. 2 and 3, terminal holding holes 21 for holding the inserted columnar terminals 10 are formed in the connector housing 20A of the liquid-proof connector 1A. In the liquid-proof connector 1A, an in-holding-hole insertion portion 11 which is a portion being present within the terminal holding hole 21 of the columnar terminal 10 is fixed to the terminal holding hole 21 in an airtight state by bringing a surface 12 in close contact with an inner surface 22 of the terminal holding hole 21. Fitting portions 35 which fit to counterpart terminals are formed at the connector housing 20A of the liquid-proof connector 1A.

The liquid-proof connector 1A illustrated in FIGS. 1 and 2 is an example of a liquid-proof connector which electrically connects a motor and an inverter constituting an electric vehicle or a hybrid vehicle to each other. The liquid-proof connector 1A electrically connects the motor and the inverter to each other, and has high liquid-proof properties on a motor side and an inverter side. For example, the liquid-proof connector 1A restrains hydraulic oil used on the motor side from flowing to an interface between the columnar terminal 10 and the terminal holding hole 21.

The liquid-proof connector 1A is an example of a so-called cable type liquid-proof connector which electrically connects the motor and the inverter to each other through a cable. As a modification example, the liquid-proof connector 1A may be a so-called cableless type liquid-proof connector which electrically connects the motor and the inverter to each other without a cable.

The liquid-proof connector 1A is an example of a liquid-proof connector for use in a so-called in-wheel motor system in which the motor and the inverter are accommodated in a driving wheel. As a modification example, the liquid-proof connector 1A may be a liquid-proof connector for use in a typical system in which the motor and the inverter are connected to the driving wheel through drive shafts.

(Columnar Terminal)

The columnar terminal 10 is a columnar terminal having a rectangular cross-sectional shape CS as illustrated FIG. 3. The cross-sectional shape CS of the columnar terminal 10 may be the rectangle, and an aspect ratio or the like of the rectangle is not particularly limited. The rectangle mentioned in the present embodiment means a rectangle in which a corner portion of the cross-sectional shape CS of the columnar terminal 10 has R0 mm to R1 mm.

The cross-sectional shape CS of the columnar terminal 10 may be the rectangle, and a shape in a longitudinal direction is not particularly limited. As illustrated in FIGS. 1 to 3, the columnar terminal 10 of the liquid-proof connector 1A is partially bent in the longitudinal direction. Alternatively, the columnar terminal 10 may have a shape in which a part thereof is not bent.

In the liquid-proof connector 1A, the in-holding-hole insertion portion 11 which is a portion being present within the terminal holding hole 21 of the columnar terminal 10 is fixed to the terminal holding hole 21 in the airtight state by bringing the surface 12 in close contact with the inner surface 22 of the terminal holding hole 21.

For example, tough pitch copper C1100, oxygen-free copper C1020, and the like are used as a material of the columnar terminal 10. The reason why it is preferable that these materials be used as the material of the columnar terminal 10 is that these materials have high conductivity and thermal conductivity. A linear expansion coefficient of the tough pitch copper C1100 at room temperature is about $17.7 \times 10^{-6}/°$ C.

The reason why it is preferable that anchor structures be formed on at least the surface 12 of the in-holding-hole insertion portion 11 through laser processing in the columnar terminal 10 is that the in-holding-hole insertion portion 11 firmly comes in close contact within the terminal holding hole 21 and the liquid-proof properties of the liquid-proof connector 1A tend to be high. The anchor structures formed through the laser processing mentioned herein mean patterned anchor structures formed on a surface of metal with submillimeter depths and spacings.

The depth of the anchor structure is, for example, 0.05 to 0.10 mm, and preferably, 0.06 to 0.10 mm. The reason why it is preferable that the depth of the anchor structure fall within the aforementioned range is that the columnar terminal 10 firmly comes in close contact with the terminal holding hole 21 of the connector housing 20 and the liquid-proof properties of the liquid-proof connector 1A tend to be high.

The spacing between the anchor structures is, for example, 0.09 to 0.20 mm, and preferably, 0.09 to 0.15 mm. The reason why it is preferable that the spacing between the anchor structures fall within the aforementioned range is that the columnar terminal 10 firmly comes in close contact with the terminal holding hole 21 of the connector housing 20 and the liquid-proof properties of the liquid-proof connector 1A tend to be high.

(Connector)

The connector 40A includes the connector housing 20A. Specifically, the connector 40A includes the connector housing 20A and the connector-housing peripheral portion 30A formed in the periphery of the connector housing 20A. In the liquid-proof connector 1A, the connector housing 20A and the connector-housing peripheral portion 30A of the connector 40A are separate members. In the liquid-proof connector 1A, the connector-housing peripheral portion 30A comes in close contact with the periphery of the connector housing 20A.

The reason why it is preferable that the connector housing 20A and the connector-housing peripheral portion 30A be the separate members is that the connector housing 20A becomes compact and thus, it is easy to perform the insert molding of the columnar terminal 10 and the connector housing 20A.

<Connector Housing>

The connector housing 20A is obtained through the insert molding with the columnar terminal 10, is made of fiber-reinforced plastic in which fibers are oriented in the longitudinal direction of the columnar terminal 10, and has the terminal holding hole 21 to which the columnar terminal 10 is inserted and the fitting portion 35 which fits to the counterpart terminal. In the liquid-proof connector 1A, the columnar terminal 10 and the connector housing 20A are fixed in the airtight state by bringing the surface 12 of the in-holding-hole insertion portion 11 of the columnar terminal 10 in close contact with the inner surface 22 of the terminal holding hole 21 of the connector housing 20A.

The connector housing 20A includes a terminal holding portion 24 having the terminal holding hole 21. As illustrated in FIG. 2, the terminal holding hole 21 is formed in a central portion of the terminal holding portion 24 of the connector housing 20A.

The connector housing 20A has the fitting portion 35 which fits to the counterpart terminal at the periphery of the terminal holding portion 24 having the terminal holding hole 21. As illustrated in FIG. 2, the fitting portions 35 extend from a surface of the terminal holding portion 24 so as to enclose the columnar terminals 10 protruding from the terminal holding holes 21. Fitting openings 37 which fit to the counterpart terminals are formed in an inner surface of the fitting portion 35.

In the connector 40A, the fitting portions 35 are formed on both front and rear surfaces of the connector 40A in an opposite to each other. Accordingly, it is possible to electrically connect two members in a state in which the columnar terminal 10 has a minimum length in the liquid-proof connector 1A.

In the fiber-reinforced plastic used for the connector housing 20A, the fibers are held in a cured resin. In the case of the fibers of the connector housing 20A, the orientations of the fibers typically coincide with a flow direction (MD direction) in the insert molding, that is, the longitudinal direction of the columnar terminal 10. The cured resin is formed by curing a resin having fluidity during the insert molding.

For example, one or more kinds of resins selected from the group consisting of syndiotactic polystyrene (SPS), polyphenylene sulfide (PPS), and nylon 66 (PA66) are used as the resin used for the fiber-reinforced plastic. The reason why it is preferable that these resins be used as the fiber-reinforced plastic is that the tensile strength of these resins in a direction (TD direction) perpendicular to the MD direction is high.

The MD direction and the TD direction will be described with reference to the drawings. In FIG. 2, the MD direction is a direction denoted by a reference sign M. As illustrated in FIG. 2, the MD direction M coincides with the longitudinal direction of the columnar terminal 10. The TD direction is the direction perpendicular to the MD direction, and is not limited to a specific one direction. The TD direction is, for example, a direction denoted by reference sign $T_{CS}$ or $T_{DP}$ in FIGS. 2 and 3. Specifically, the reference sign $T_{CS}$ denotes the TD direction perpendicular to the cross section in FIG. 2, and the reference sign $T_{DP}$ denotes the other TD direction perpendicular to the cross section in FIG. 2.

For example, glass fibers, carbon fibers, aromatic polyamide fibers, boron fibers, and the like are used as the fibers constituting the fiber-reinforced plastic. The reason why it is preferable that the glass fibers be used for the fiber-reinforced plastic is that the tensile strength of the glass fibers among these fibers in the TD direction is high.

A linear expansion coefficient of the fiber-reinforced plastic used for the connector housing 20A at room temperature in the MD direction is, for example, $19 \times 10^{-6}/°$ C. to $39 \times 10^{-6}/°$ C., preferably, $19 \times 10^{-6}/°$ C. to $26 \times 10^{-6}/°$ C., and more preferably, $19 \times 10^{-6}/°$ C. to $20 \times 10^{-6}/°$ C. The reason why it is preferable that a numerical range of the linear expansion coefficient fall within the aforementioned range is that a difference between values of the linear expansion coefficients of the columnar terminal 10 and the connector housing 20A is small and the columnar terminal 10 and the terminal holding hole 21 are hardly separated from each other when the material of the columnar terminal 10 is made of the tough pitch copper C1100. When one or more kinds of resins selected from the group consisting of SPS, PPS, and PA66 is used as the resin for the fiber-reinforced plastic and the fibers are the glass fibers, the linear expansion coefficient tends to be $19 \times 10^{-6}/°$ C. to $39 \times 10^{-6}/°$ C.

The tensile strength of the fiber-reinforced plastic used for the connector housing 20A in the direction (TD direction) perpendicular to the longitudinal direction (MD direction) of the columnar terminal 10 is 45 MPa or more, and preferably, 60 MPa or more. The tensile strength of the fiber-reinforced plastic in the TD direction is strength measured by pulling the fibers in a direction in which spacings between a plurality of fibers oriented in the MD direction and arranged in parallel in the fiber-reinforced plastic are separated from each other. Since the tensile strength of the fiber-reinforced plastic used for the connector housing 20A in the TD direction is high, the periphery of the terminal holding hole 21, for example, a corner portion 23 hardly cracks or peels off. The corner portion 23 mentioned herein means a portion which is formed at the periphery of a corner of the terminal holding hole 21 of the connector housing 20A.

In FIG. 2, the MD direction is a direction denoted by a reference sign M. As illustrated in FIG. 2, the MD direction M coincides with the longitudinal direction of the columnar terminal 10. The TD direction is the direction perpendicular to the MD direction, and is not limited to a specific one direction. For example, the TD direction is the direction denoted by the reference sign $T_{CS}$ or $T_{DP}$ in FIGS. 2 and 3. Specifically, the reference sign $T_{CS}$ denotes the TD direction perpendicular to the cross section in FIG. 2, and the reference sign $T_{DP}$ denotes the other TD direction perpendicular to the cross section in FIG. 2.

The periphery or corner portion of the terminal holding hole 21 will be described with reference to the drawing. As illustrated in FIG. 3, stress is concentrated on the periphery of the terminal holding hole 21 having the rectangular cross section of the connector housing 20A due to contact with the columnar terminal 10, and thus, the periphery of the terminal holding hole 21 tends to crack or peel off. Intense stress is concentrated on the periphery of the terminal holding hole 21, particularly, the corner portion 23 of the terminal holding hole 21, and thus, the periphery or the corner portion of the terminal holding hole 21 tends to further crack or peel off.

In contrast, in the present embodiment, since the tensile strength of the fiber-reinforced plastic used for the connector housing 20A in the TD direction is high as stated above, it is possible to restrain the periphery of the terminal holding hole 21, particularly, the corner portion 23 of the terminal holding hole 21 from cracking or peeling off.

<Connector-Housing Peripheral Portion>

The connector-housing peripheral portion 30A is a member formed at the periphery of the connector housing 20A. In the liquid-proof connector 1A, the connector-housing peripheral portion 30A is a member separate from the connector housing 20A, and is formed at the periphery of the connector housing 20A.

The connector-housing peripheral portion 30A includes a peripheral base portion 32 which comes in close contact with the periphery of the connector housing 20.

A material of the connector-housing peripheral portion 30A is not particularly limited. However, the reason why it is preferable that the material of the connector-housing peripheral portion 30A be the fiber-reinforced plastic is that the connector-housing peripheral portion 30A tends to have high strength and high airtightness at a bonded portion of the connector-housing peripheral portion 30A and the connector housing 20A. For example, the same material as the material of the connector housing 20A can be used as the material used for the connector-housing peripheral portion 30A.

(Seal Pressure)

As stated above, in the liquid-proof connector 1A, the in-holding-hole insertion portion 11 which is a portion being present within the terminal holding hole 21 of the columnar terminal 10 is fixed to the terminal holding hole 21 in the airtight state by bringing the surface 12 in close contact with the inner surface 22 of the terminal holding hole 21. The airtight state mentioned herein is defined as a state in which a seal pressure of a' terminal-and-fiber-reinforced-plastic airtight interface 15 which is the interface between the inner surface 22 of the terminal holding hole 21 and the surface 12 of the in-holding-hole insertion portion 11, which come in close contact with each other, is 50 kPa or more.

That is, in the liquid-proof connector 1A, the seal pressure of the terminal-and-fiber-reinforced-plastic airtight interface 15 which is the interface between the inner surface 22 of the terminal holding hole 21 and the surface 12 of the in-holding-hole insertion portion 11, which come in close contact with each other, is 50 kPa or more. FIG. 3 illustrates the inner surface 22 of the terminal holding hole 21, the surface 12 of the in-holding-hole insertion portion 11, and the terminal-and-fiber-reinforced-plastic airtight interface 15.

The seal pressure mentioned herein means a pressure of compressed air 66 when the compressed air flows to the terminal-and-fiber-reinforced-plastic airtight interface 15 and the terminal-and-fiber-reinforced-plastic airtight interface 15 peels off.

Figure 7:
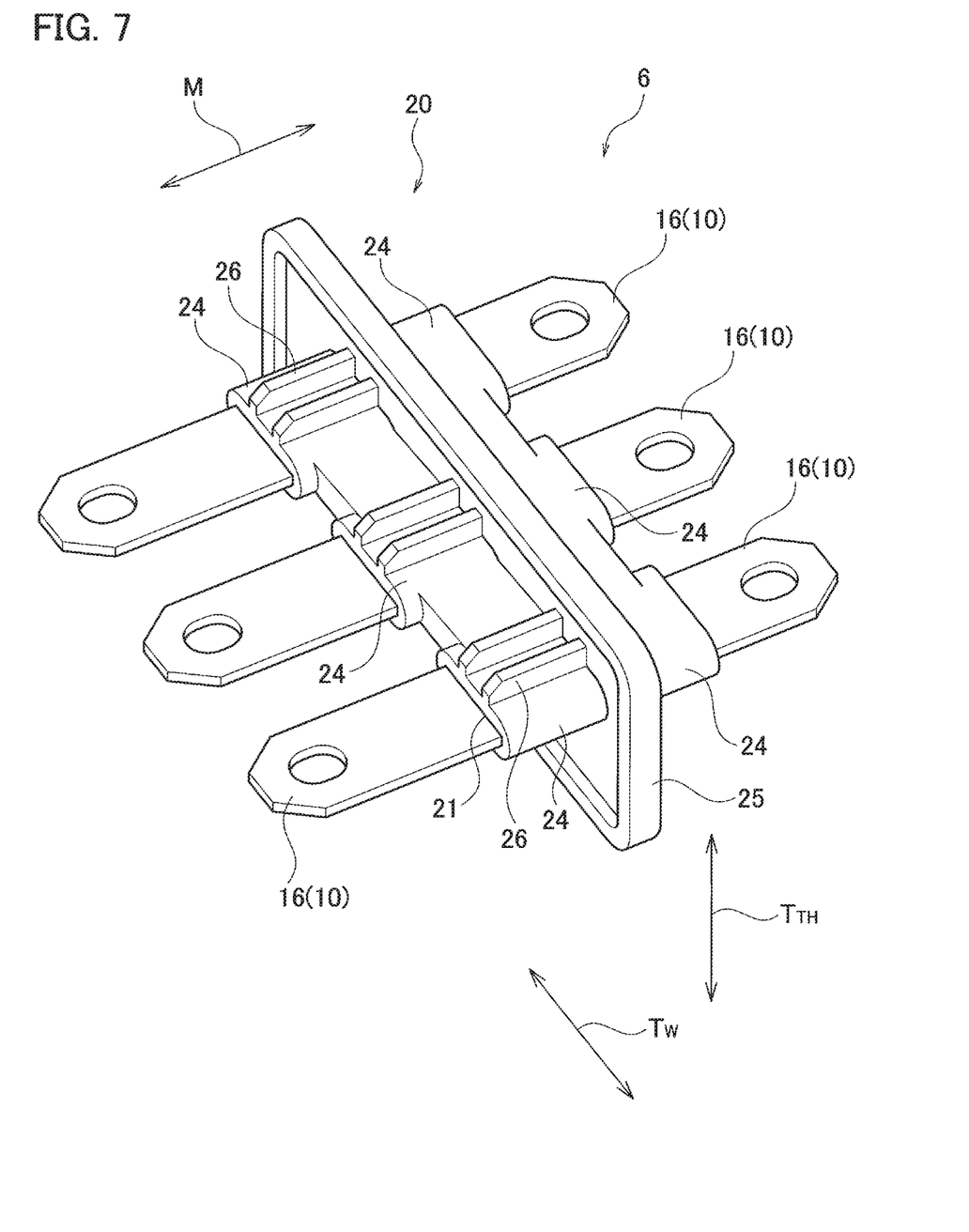
FIG. 7 is a perspective view of an airtightness test piece.
Figure 8:
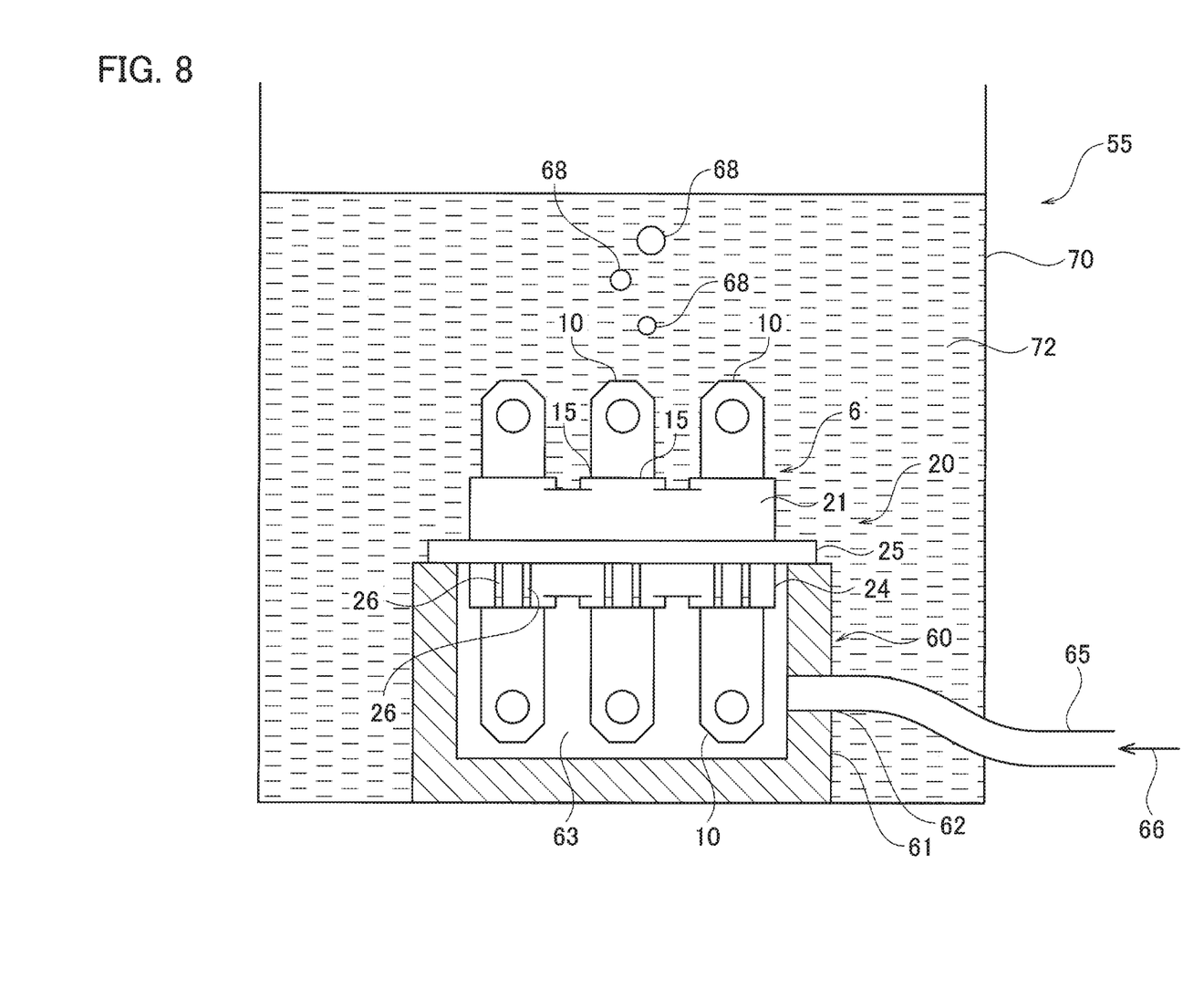
FIG. 8 is a diagram illustrating an airtightness measurement device.

For example, the seal pressure can be measured by setting an airtightness test piece 6 illustrated in FIG. 7 to an airtightness measurement device 55 illustrated in FIG. 8.

<Airtightness Test Piece>

The airtightness test piece 6 illustrated in FIG. 7 is a test piece in which busbar test pieces 16 as the columnar terminals 10 are fixed to terminal holding holes of the connector housing 20A of the liquid-proof connector 1A in an airtight state. As illustrated in FIG. 7, the airtightness test piece 6 includes the busbar test pieces 16 each having a rectangular cross-sectional shape, and a connector housing 20 which is made of the fiber-reinforced plastic and has the terminal holding holes 21 to which the busbar test pieces 16 are inserted.

The busbar test piece 16 is made of the same material as the material of the columnar terminal 10. The busbar test piece 16 is made of, for example, the tough pitch copper C1100. In FIG. 7, a longitudinal direction (MD direction) of the busbar test piece 16 equivalent to the columnar terminal 10 of the liquid-proof connector 1A is denoted by a reference sign M, and an example of the TD direction is denoted by a reference sign $T_{TH}$ or $T_W$.

In the case of the fiber-reinforced plastic used for the connector housing 20 of the airtightness test piece 6, the fibers are oriented in the longitudinal direction of the busbar test piece 16 through insert molding with the busbar test piece 16. The material of the fiber-reinforced plastic used for the connector housing 20 is the same as the material of the connector housing 20A of the liquid-proof connector 1A. The fibers in the fiber-reinforced plastic of the airtightness test piece 6 are oriented in the direction of the reference sign M in FIG. 7.

The connector housing 20 of the airtightness test piece 6 includes a rectangular tube-shaped terminal holding portion 24 that has three terminal holding holes 21 and covers the peripheries of three busbar test pieces 16, and a flat-shaped bottom base portion 25 formed at the periphery of the terminal holding portion 24. In the connector housing 20 of the airtightness test piece 6, ribs 26 protruding from a surface of the rectangular tube-shaped terminal holding portion 24 are formed.

<Airtightness Measurement Device>

The airtightness measurement device 55 illustrated in FIG. 8 includes an airtightness measurement jig 60 which forms a sealed space 63 therein through the attachment of the airtightness test piece 6, a tube 65 that supplies compressed air into the sealed space 63 within the airtightness measurement jig 60, and a water tank 70.

The airtightness measurement jig 60 includes a box-shaped casing 61 having an open surface, and is capable of forming the sealed space 63 therein through the attachment of the airtightness test piece 6 onto the open surface. In the airtightness measurement jig 60, the tube 65 is inserted to a venthole 62 drilled in the box-shaped casing 61, and thus, the compressed air is supplied to the sealed space 63 from the tube 65. The airtightness measurement jig 60 is mounted within the water tank 70 that stores water 72 in a state in which the airtightness test piece 6 and the tube 65 are attached.

Accordingly, in the airtightness measurement device 55, when a pressure within the sealed space 63 is equal to or greater than a predetermined value, air passes through the terminal-and-fiber-reinforced-plastic airtight interface 15 of the airtightness test piece 6 attached to the airtightness measurement jig 60, and is discharged as bubbles 68 in the water 72. In the present embodiment, the pressure of the compressed air when the bubbles 68 are detected in the water 72 is defined as the seal pressure.

(Advantages>

In the liquid-proof connector 1A according to the present embodiment, the connector housing 20A having the terminal holding holes 21 which is formed through the insert molding with the columnar terminal 10 is made of the fiber-reinforced plastic in which the fibers are oriented in the longitudinal direction of the columnar terminal 10. In the liquid-proof connector 1A according to the present embodiment, the tensile strength of the fiber-reinforced plastic in the direction (TD direction) perpendicular to the longitudinal direction (MD direction) of the columnar terminal 10 is 45 MPa or more. Thus, in the liquid-proof connector 1A according to the present embodiment, since the periphery of the terminal holding hole 21, for example, the corner portion 23 hardly cracks or peels off, the liquid-proof properties are high.

In the liquid-proof connector 1A according to the present embodiment, since the cross-sectional shape of the columnar terminal 10 is the rectangle, a cross-sectional area of the columnar terminal 10 is easily set so as to be relatively larger than a size of the liquid-proof connector 1A. Therefore, in accordance with the liquid-proof connector 1A according to the present embodiment, a compact high-current liquid-proof connector is obtained.

Therefore, in accordance with the liquid-proof connector 1A according to the present embodiment, it is possible to provide a compact high-current liquid-proof connector which is obtained through insert molding and has high liquid-proof properties since the periphery of the terminal holding hole hardly cracks or peels off.

In the liquid-proof connector 1A according to the present embodiment, the connector housing 20A and the connector-housing peripheral portion 30A are the separate members. Therefore, in accordance with the liquid-proof connector 1A according to the present embodiment, it is easy to perform the insert molding of the columnar terminal 10 and the connector housing 20A.

In accordance with the liquid-proof connector 1A according to the present embodiment, it is possible to provide a liquid-proof connector with excellent airtightness in wire harnesses of electronic equipment; in-vehicle and electrical components; transmissions; electronic devices, relays, sensors, and the like. In accordance with the liquid-proof connector 1A according to the present embodiment, it is possible to achieve a reduction in size and a low profile of the liquid-proof connector along with a reduction in the number of components.

In accordance with the liquid-proof connector 1A according to the present embodiment, it is possible to expand the use of the liquid-proof connector 1A for the wire harness. For example, it is possible to use a liquid-proof connector for a transmission for an oil-cooled motor harness, and it is possible to expand the use of the liquid-proof connector for the wire harness.

The liquid-proof connector 1A according to the present embodiment is obtained through the insert molding. Therefore, in accordance with the liquid-proof connector 1A according to the present embodiment, it is possible to complete water stop processing due to the close contact of the columnar terminal 10 and the connector housing 20A in a short time of one minute or less.

In the liquid-proof connector 1A according to the present embodiment, the columnar terminal 10 and the connector housing 20A firmly come in close contact with each other. Therefore, in accordance with the liquid-proof connector 1A according to the present embodiment, it is possible to secure a water stop function due to the close contact of the columnar terminal 10 and the connector housing 20A over a long period of time.

In the liquid-proof connector 1A according to the present embodiment, the columnar terminal 10 and the connector housing 20A firmly come in close contact with each other. Therefore, in accordance with the liquid-proof connector 1A according to the present embodiment, a decrease in airtightness is suppressed even though external stress is exerted at the time of bolt-fastening or assembling of the liquid-proof connector 1A.

Modification Example of First Embodiment

In the liquid-proof connector 1A according to the first embodiment, the aspect in which the connector housing 20A and the connector-housing peripheral portion 30A constituting the connector 40A are the separate members has been described. However, as a modification example of the liquid-proof connector 1A, a configuration in which the connector housing 20A and the connector-housing peripheral portion 30A constituting the connector 40A are integrally formed through the insert molding may be adopted.

In accordance with the liquid-proof connector according to this modification example, since it is possible to manufacture the liquid-proof connector through only the insert molding of the columnar terminal 10 and the connector 40, it is easy to manufacture the liquid-proof connector.

[Manufacturing Method]

The liquid-proof connector 1 according to the aforementioned embodiment can be manufactured through the known insert molding of the columnar terminal 10 and the connector housing 20 or the connector 40.

EXAMPLES

Hereinafter, the present invention will be described in more detail in conjunction with examples and comparative examples, but the present invention is not limited to these examples.

Materials used in the examples are as follows.
R1: syndiotactic polystyrene resin, glass fiber reinforced, UL94 HB Grade XAREC (registered trademark) S131 manufactured by Idemitsu Kosan Co., Ltd.
R2: syndiotactic polystyrene resin, PA66/SPS Grade XAREC (registered trademark) NWA7030 manufactured by Idemitsu Kosan Co., Ltd.
R3: PPS resin Torelina (registered trademark) A675GS1 manufactured by Toray Industries, Inc.
R4: PPS resin DURAFIDE (registered trademark) 6150T73 manufactured by Polyplastics Co., Ltd.
R5: Polyamide resin Zytel (registered trademark) HTN51G35EF manufactured by E. I. du Pont de Nemours and Company
R6: PPS resin DURAFIDE (registered trademark) 1140A6 manufactured by Polyplastics Co., Ltd.
Compositions of the materials are represented in Table 1.

Example 1

Figure 4:
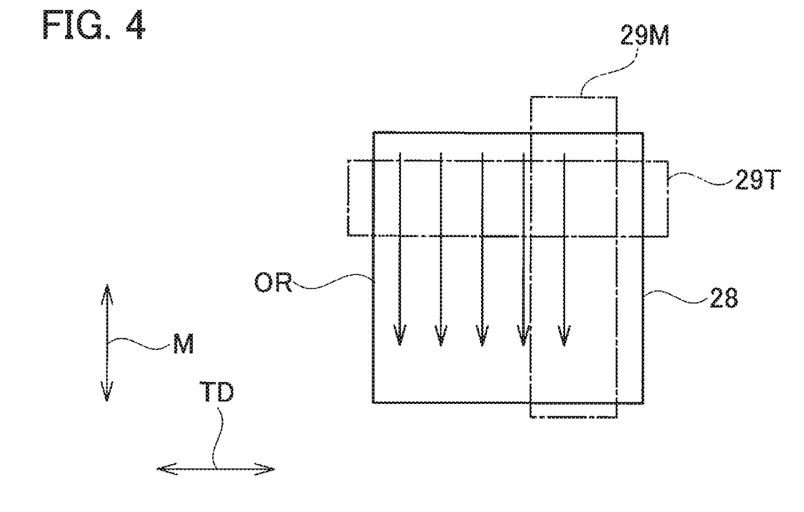
FIG. 4 is a schematic plan view of a fiber-reinforced plastic plate.

(1. Tensile Strength)
<Tension Test Piece>
A fiber-reinforced plastic plate of 60 mm height×60 mm width×2 mm thickness defined in ASTM D732 was manufactured by using syndiotactic polystyrene resin, XAREC (registered trademark) S131 (material No. R1) manufactured by Idemitsu Kosan Co., Ltd. This fiber-reinforced plastic plate 28 was used as a sample No. A-1. FIG. 4 illustrates a schematic plan view of the fiber-reinforced plastic plate 28. In FIG. 4, an arrow OR denotes a direction of the orientations of the fibers in the fiber-reinforced plastic, a reference sign M denotes the MD direction, and a reference sign TD denotes the TD direction. The direction OR of the orientations of the fibers in the fiber-reinforced plastic plate 28 coincides with the MD direction.

Figure 5:
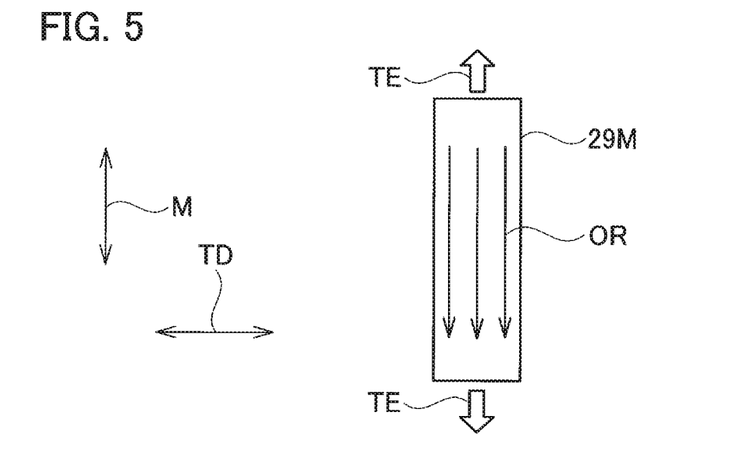
FIG. 5 is a schematic plan view of a tension test piece of which a longitudinal direction is an MD direction.
Figure 6:
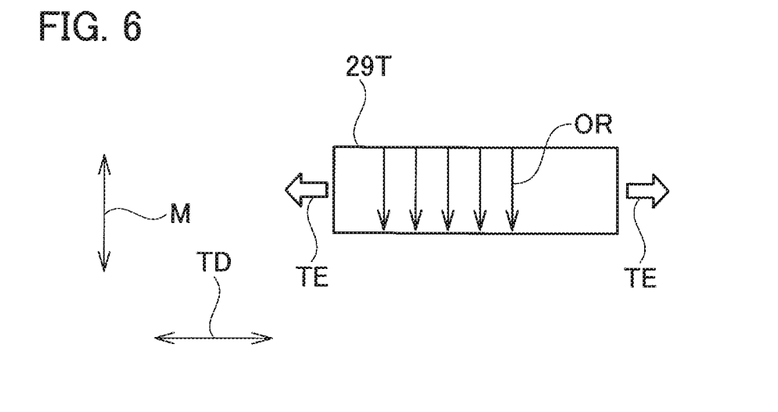
FIG. 6 is a schematic plan view of a tension test piece of which a longitudinal direction is a TD direction.

Subsequently, tension test pieces 29M and 29T of 20 mm width×60 mm long×2 mm thickness were cut out from the fiber-reinforced plastic plate 28. As illustrated in FIG. 5, the tension test piece 29M was cut out such that the direction OR (MD direction M) of the orientations of the fibers in the tension test piece 29M coincided with a longitudinal direction of the tension test piece 29M. As illustrated in FIG. 6, the tension test piece 29T was cut out such that the direction OR (MD direction M) of the orientations of the fibers in the tension test piece 29T coincided with a width direction of the tension test piece 29T.

<Tension Testing>

Tension was exerted at a speed of 10 mm/minute in the longitudinal directions of the tension test pieces 29M and 29T by using Precision Universe Tester Autograph AG-1 manufactured by Shimadzu Corporation, and tensile strengths (MPa) were measured. In the tension test piece 29M, a tension direction TE of the tension coincided with the longitudinal direction of the tension test piece 29M, that is, the direction OR (MD direction M) of the orientations of the fibers. In the tension test piece 29T, the tension direction TE of the tension coincided with the longitudinal direction of the tension test piece 29T, that is, the direction (TD direction TD) perpendicular to the direction OR of the orientations of the fibers.

The results of the tensile strengths are represented in Table 1.

TABLE 1

| Example No. | | | | Example 1 | Example 2 |
|---|---|---|---|---|---|
| Tension Test Piece | Sample No. | | | A-1 | A-2 |
| | Fiber-Reinforced Plastic Composition | Resin | Product Name | XAREC S131 | XAREC NWA7030 |
| | | | Type | SPS | PA66/SPS |
| | | | Compound Amount (parts by weight) | 70 | 70 |
| | | Fiber | Type | Glass Fiber | Glass Fiber |
| | | | Compound Amount (parts by weight) | 30 | 30 |
| | Linear Expansion Coefficient (at room temperature) (×10$^{-6}$/° C.) | | | 25.5 | 38.0 |
| | Tensile Strength (MD direction) (MPa) | | | 86.4 | 128.5 |
| | Tensile Strength (TD direction) (MPa) | | | 48.6 | 45.3 |
| | Remarks | | | | |
| Airtightness Test Piece | Before Thermal Shock Testing | Sample No. | | B-1 | B-2 |
| | | Seal Pressure (kPa) | | more than 400 | more than 400 |
| | | Evaluation about Seal Pressure | | ○ (good) | ○ (good) |
| Airtightness Test Piece | After Thermal Shock Testing | Sample No. | | C-1 | C-2 |
| | | Seal Pressure (kPa) | | 60 | 55 |
| | | Evaluation about Seal Pressure | | ○ (good) | ○ (good) |
| | | Evaluation about Occurrence of Crack (Observation by SEM-EDX) | | Δ (average) | Δ (average) |
| Comprehensive Determination | | | | ○ (good) | ○ (good) |

TABLE 2

| Example No. | | | | Example 3 | Example 4 |
|---|---|---|---|---|---|
| Tension Test Piece | Sample No. | | | A-3 | A-4 |
| | Fiber-Reinforced Plastic Composition | Resin | Product Name | Torelina A675GS1 | DURAFIDE 6150T73 |
| | | | Type | PPS | PPS |
| | | | Compound Amount (parts by weight) | 50 | 60 |
| | | Fiber | Type | Glass Fiber | Glass Fiber |
| | | | Compound Amount (parts by weight) | 50 | 40 |
| | Linear Expansion Coefficient (at room temperature) (×10$^{-6}$/° C.) | | | 19.7 | 19.6 |
| | Tensile Strength (MD direction) (MPa) | | | 82.6 | 98.4 |
| | Tensile Strength (TD direction) (MPa) | | | 63.3 | 67.5 |
| | Remarks | | | Including Inorganic Filler | |
| Airtightness Test Piece | Before Thermal Shock Testing | Sample No. | | B-3 | B-4 |
| | | Seal Pressure (kPa) | | more than 400 | more than 400 |
| | | Evaluation about Seal Pressure | | ○ (good) | ○ (good) |
| Airtightness Test Piece | After Thermal Shock Testing | Sample No. | | C-3 | C-4 |
| | | Seal Pressure (kPa) | | more than 400 | more than 400 |
| | | Evaluation about Seal Pressure | | ○ (good) | ○ (good) |
| | | Evaluation about Occurrence of Crack (Observation by SEM-EDX) | | ○ (good) | ○ (good) |
| Comprehensive Determination | | | | ○ (good) | ○ (good) |

TABLE 3

| Example No. | | | | Comparative Example 1 |
|---|---|---|---|---|
| Tension Test Piece | Sample No. | | | A-5 |
| | Fiber-Reinforced Plastic Composition | Resin | Product Name | Zytel HTN51 G35EF |
| | | | Type | PA6T |
| | | | Compound Amount (parts by weight) | 65 |
| | | Fiber | Type | Glass Fiber |
| | | | Compound Amount (parts by weight) | 35 |
| | Linear Expansion Coefficient (at room temperature) (×10$^{-6}$/° C.) | | | 29.8 |
| | Tensile Strength (MD direction) (MPa) | | | 125.3 |
| | Tensile Strength (TD direction) (MPa) | | | 35.7 |
| | Remarks | | | |
| Airtightness Test Piece | Before Thermal Shock Testing | Sample No. | | B-5 |
| | | Seal Pressure (kPa) | | more than 400 |
| | | Evaluation about Seal Pressure | | ○ (good) |
| Airtightness Test Piece | After Thermal Shock Testing | Sample No. | | C-5 |
| | | Seal Pressure (kPa) | | 35 |
| | | Evaluation about Seal Pressure | | x (bad) |
| | | Evaluation about Occurrence of Crack (Observation by SEM-EDX) | | x (bad) |
| Comprehensive Determination | | | | x (bad) |

(2. Airtightness Before Thermal Shock Testing)
<Airtightness Test Piece>

The busbar test piece 16 (linear expansion coefficient (room temperature) of $17.7 \times 10^{-5}/°$ C.) manufactured using tin-plated C1100 ½H in which 82.95 mm long×15 mm width×2 mm thickness and 4–R=0.3 was prepared. The busbar test piece 16 is equivalent to the columnar terminal 10 of the liquid-proof connector 1.

An airtightness test piece was manufactured by presetting three busbar test pieces 16 in a mold and performing the insert molding within the mold by using the material No. R1. This airtightness test piece 6 was used as a sample No. B-1. FIG. 7 illustrates a perspective view of the airtightness test piece 6.

As illustrated in FIG. 7, the airtightness test piece 6 is a test piece in which the busbar test pieces 16 as the columnar terminals 10 are fixed to the rectangular terminal holding holes 21 of 15 mm height×2 mm width in the connector housing 20 made of the fiber-reinforced plastic in the airtight state. The connector housing 20 of the airtightness test piece 6 includes a rectangular tube-shaped terminal holding portion 24 that has three terminal holding holes 21 and covers the peripheries of three busbar test pieces 16, and a flat-shaped bottom base portion 25 formed at the periphery of the terminal holding portion 24. The rectangular tube-shaped terminal holding portion 24 that covers the peripheries of the busbar test pieces 16 had a thickness of 6 mm. In the connector housing 20 of the airtightness test piece 6, the ribs 26 protruding from the surface of the rectangular tube-shaped terminal holding portion 24 were formed.

<Airtightness Measurement Device>

The airtightness measurement device 55 illustrated in FIG. 8 was prepared. The airtightness measurement device 55 includes the airtightness measurement jig 60 capable of forming a sealed space 63 therein through the attachment of the airtightness test piece 6 (sample No. B-1), the tube 65 that supplies the compressed air into the sealed space 63 within the airtightness measurement jig 60, and the water tank 70.

The airtightness measurement jig 60 is made of aluminum, has a box-shaped casing 61 having an open surface, and is capable of forming the sealed space 63 therein by attaching the bottom base portion 25 of the airtightness test piece 6 to the open surface. In the airtightness measurement jig 60, the tube 65 is inserted to a venthole drilled in the box-shaped casing 61, and thus, the compressed air is supplied to the sealed space 63 from the tube 65. The airtightness measurement jig 60 is mounted within the water tank 70 that stores water 72 in a state in which the airtightness test piece 6 and the tube 65 are attached.

Accordingly, in the airtightness measurement device 55, when a pressure within the sealed space 63 is equal to or greater than a predetermined value, air passes through the terminal-and-fiber-reinforced-plastic airtight interface 15 of the airtightness test piece 6 attached to the airtightness measurement jig 60, and is discharged as bubbles 68 in the water 72.

<Airtightness Testing>

The compressed air was supplied to the sealed space 63 from the tube 65 by using the airtightness measurement device 55 to which the airtightness test piece 6 (sample No. B-1) is attached. The pressure of the compressed air was the seal pressure (kPa) when the air passed through the terminal-and-fiber-reinforced-plastic airtight interface 15 and the bubbles 68 were discharged in the water 72.

Specifically, the compressed air of 10 kPa was supplied to the sealed space 63 of the airtightness measurement device 55 mounted in the water 72 through the tube 65 for 30 seconds, and the discharging of the bubbles 68 from the terminal-and-fiber-reinforced-plastic airtight interface 15 was observed. This is referred to as airtightness testing at 10 kPa.

When the discharging of the bubbles 68 was not observed in the airtightness testing at 10 kPa, airtightness testing at 20 kPa was performed similarly to the airtightness testing at 10 kPa except that the pressure of the compressed air was increased to 20 kPa by 10 kPa.

Similarly, when the discharging of the bubbles 68 was not observed in the airtightness testing at 20 kPa, airtightness testing at 30 kPa was performed similarly to the airtightness testing at 10 kPa except that the pressure of the compressed air was increased to 30 kPa by 10 kPa.

As stated above, when the discharging of the bubbles 68 was not observed in the airtightness testing at 10 kPa, the airtightness testing was repeatedly performed while the pressure of the compressed air was increased to 10n kPa (n is a natural number of 2 or more) by 10 kPa until the discharging of the bubbles 68 was observed.

The pressure of the compressed air when the discharging of the bubbles 68 was observed, which indicated $10q$ kPa (q is a natural number of 1 or more), was defined as the seal pressure (kPa).

The results of the seal pressures are represented in Table 1.

A seal pressure "after thermal shock testing" to be described below of Example 1 and seal pressures "before thermal shock testing" and "after thermal shock testing" of Example 2 to be described below are represented in Table 1.

The seal pressure "before thermal shock testing" and the seal pressures "after thermal shock testing" of Examples 3 and 4 and Comparative example 1 are represented in Tables 2 and 3.

In Tables 1 to 3, for the seal pressures "before thermal shock testing" and "after thermal shock testing", the seal pressure of 50 kPa or more was determined as Pass (good), and was expressed by a symbol ○ in Tables 1 to 3. The seal pressure of less than 50 kPa was determined as Fail (bad), and was expressed by a symbol x in Tables 1 to 3.

(3. Thermal Shock Testing)

The same airtightness test piece 6 as the airtightness test piece 6 (sample No. B-1) used in "2. Airtightness Before Thermal Shock Testing" was prepared. An airtightness test piece 6 (sample No. C-1) after the thermal shock testing was obtained by performing the thermal shock testing on the airtightness test piece 6 (sample No. B-1).

As the thermal shock testing, testing in which thermal history in which the airtightness test piece 6 (sample No. B-1) is held at −40° C. for 30 minutes and is then held at 120° C. for 30 minutes is one cycle and the thermal history is repeated by 1000 cycles was used.

That is, the airtightness test piece 6 (sample No. C-1) after the thermal shock testing was obtained by giving the thermal history of 1000 cycles to the airtightness test piece 6 (sample No. B-1) before the thermal shock testing.

(4. Airtightness after Thermal Shock Testing)

The seal pressure (kPa) of the airtightness test piece 6 after the thermal shock testing was measured similarly to "2. Airtightness Before Thermal Shock Testing" except that the airtightness test piece 6 (sample No. C-1) after the thermal shock testing was used instead of the airtightness test piece 6 (sample No. B-1).

The results of the seal pressures are represented in Table 1.

(5. Cross Section Observation)
<Cross-Section Observation Sample>

The airtightness test piece 6 (sample No. C-1) after the thermal shock testing was prepared. The cross section of the periphery of the terminal-and-fiber-reinforced-plastic airtight interface 15 of the airtightness test piece (sample No. C-1) was observed, and whether or not the corner portion 23 cracks was observed.

Specifically, after an epoxy resin having fluidity is cured while holding the airtightness test piece 6 (sample No. C-1) in the epoxy resin, the airtightness test piece 6 together with the cured object of the epoxy resin was cut in the cross section along the direction perpendicular to the MD direction M of FIG. 7. Accordingly, a cross-section observation sample including the cross section of the busbar test piece 16 was manufactured. The obtained cross-section observation sample of the airtightness test piece 6 had the cross section of the corner portion 23 at the periphery of the terminal-and-fiber-reinforced-plastic airtight interface 15 as in FIG. 3.

<Observation Method and Evaluation>

A cross section of the cross-section observation sample which includes the corner portion 23 at the periphery of the terminal-and-fiber-reinforced-plastic airtight interface 15 was observed by using the SEM-EDX (scanning electron microscope-energy dispersive X-ray spectroscopy) SU3500 manufactured by Hitachi High-Technologies Corporation.

In "5. Cross Section Observation", the sample on which crack does not appear was evaluated as "excellent", and was expressed by a symbol ○ in Tables 1 to 3.

In the cross section observation, the sample on which the corner portion 23 of the rectangular tube-shaped terminal holding portion 24 cracks and the crack is widened to the entire of the thickness at the corner portion 23 of the terminal holding portion 24 was evaluated as "bad", and was expressed by a symbol x in Tables 1 to 3. The thickness at the corner portion 23 of the terminal holding portion 24 mentioned herein means the thickness of the corner portion 23 of the terminal holding portion 24 on the cross section to be subjected to the cross section observation.

The sample on which the corner portion 23 of the rectangular tube-shaped terminal holding portion 24 cracks and this crack is widened to only a part of the thickness at the corner portion 23 of the terminal holding portion 24 and is not widened to the entire of the thickness was evaluated as "average", and was expressed by a symbol Δ in Tables 1 to 3.

The results of the cross section observation are represented in Tables 1 to 3.

(6. Comprehensive Determination)

The comprehensive evaluation was performed from the results of "1. Tensile Strength" to "5. Cross Section Observation". The sample comprehensively evaluated as "excellent" is expressed by a symbol ○ in Tables 1 to 3. The sample comprehensively evaluated as "bad" is expressed by a symbol x in Tables 1 to 3.

Examples 2 to 4 and Comparative Example 1

(1. Tensile Strength)
<Tension Test Piece>

Fiber-reinforced plastic plates 28 (Sample Nos. A-2 to A-5) were manufactured as in "<Tension Test Piece> of "1. Tensile Strength" of Example 1 except that the material Nos. R2 to R5 represented in Tables 1 to 3 were used instead of the material No. R1. The sample Nos. A-2 to A-4 and A-5 are the samples of Examples 2 to 4 and Comparative Example 1, respectively.

Subsequently, the tension test pieces 29M and 29T of 20 mm width×60 mm long×2 mm thickness were cut out from the fiber-reinforced plastic plates 28 (sample Nos. A-2 to A-5), as in Example 1.

<Tension Testing>

The tensile strengths (MPa) were measured as in Example 1 except that the tension test pieces 29M and 29T cut out from the fiber-reinforced plastic plates 28 (sample Nos. A-2 to A-5) were used.

The results of the tensile strengths are represented in Tables 1 to 3.

(2. Airtightness Before Thermal Shock Testing)
<Airtightness Test Piece>

Airtightness test pieces 6 (sample Nos. B-2 to B-5) were manufactured as in <Airtightness Test Piece> of "2. Airtightness Before Thermal Shock Testing" of Example 1 except that the material Nos. R2 to R5 represented in Tables 1 to 3 were used instead of the material No. R1. The sample Nos. B-2 to B-4 and B-5 are the samples of Examples 2 to 4 and Comparative Example 1, respectively.

<Airtightness Measurement Device>

The same airtightness measurement device as that in Example 1 was used.

<Airtightness Testing>

The seal pressures (kPa) were measured as in <Airtightness Testing> of "2. Airtightness Before Thermal Shock Testing" of Example 1 except that the sample Nos. B-2 to B-5 were used instead of the sample No. B-1.

The results of the seal pressures are represented in Tables 1 to 3.

(3. Thermal Shock Testing)

Airtightness test pieces 6 (sample Nos. C-2 to C-5) after the thermal shock testing were obtained by performing the thermal testing as in "3. Thermal Shock Testing" of Example 1 except that the sample Nos. B-2 to B-5 were used instead of the sample No. B-1. The sample Nos. C-2 to C-4 and C-5 are the samples of Examples 2 to 4 and Comparative Example 1, respectively.

(4. Airtightness after Thermal Shock Testing)

The seal pressures (kPa) of the airtightness test pieces 6 after the thermal shock testing were measured as in "4. Airtightness After Thermal Shock Testing" of Example 1 except that the sample Nos. C-2 to C-5 were used instead of the sample No. C-1.

The results of the seal pressures are represented in Tables 1 to 3.

(5. Cross Section Observation)

The cross-section observation samples of the airtightness test pieces 6 were manufactured and the cross sections were observed as in "4. Airtightness after Thermal Shock Testing" of Example 1 except that the sample Nos. C-2 to C-5 were used instead of the sample No. C-1.

The results of the cross section observation are represented in Tables 1 to 3.

It can be seen from Tables 1 to 3 that the characteristics of Examples 1 to 4 are excellent, particularly the characteristics of Examples 3 and 4 are excellent.

Although the present invention has been described with reference to the examples, the present invention is not limited to these examples, and can be variously modified without departing from the scope of the gist of the present invention.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A liquid-proof connector comprising:
   a columnar terminal having a rectangular cross-sectional shape; and
   a connector that includes a connector housing which is obtained through insert molding with the columnar terminal, is made of fiber-reinforced plastic, and has a terminal holding hole to which the columnar terminal is inserted and a fitting portion which fits to a counterpart terminal,
   wherein an in-holding-hole insertion portion which is a portion being present within the terminal holding hole of the columnar terminal is fixed to the terminal holding hole in an airtight state by bringing a surface in close contact with an inner surface of the terminal holding hole,
   wherein the fibers in the fiber-reinforced plastic of the connector housing are oriented in a longitudinal direction of the columnar terminal, and
   wherein tensile strength of the fiber-reinforced plastic in a direction perpendicular to the longitudinal direction is 45 MPa or more.

2. The liquid-proof connector according to claim 1, wherein a seal pressure of a terminal-and-fiber-reinforced-plastic airtight interface which is an interface between the inner surface of the terminal holding hole and the surface of the in-holding-hole insertion portion, which come in close contact with each other, is 50 kPa or more.

3. The liquid-proof connector according to claim 1, wherein a plurality of anchor structures are formed on the surface of the in-holding-hole insertion portion.

4. The liquid-proof connector according to claim 3, wherein the anchor structures have a depth of 0.05 to 0.10 mm.

5. The liquid-proof connector according to claim 4, wherein a spacing between the anchor structures is 0.09 to 0.20 mm.

6. The liquid-proof connector according to claim 1, wherein the tensile strength of the fiber-reinforced plastic in a direction perpendicular to the longitudinal direction is 60 MPa or more.

* * * * *